US012022413B2

United States Patent
Wang et al.

(10) Patent No.: US 12,022,413 B2
(45) Date of Patent: Jun. 25, 2024

(54) RECEIVER TIMING ADJUSTMENT

(71) Applicant: QUALCOMM Incorporated, San Diego, CA (US)

(72) Inventors: Hua Wang, Basking Ridge, NJ (US); Sony Akkarakaran, Poway, CA (US); Kapil Gulati, Belle Mead, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 237 days.

(21) Appl. No.: 17/408,288

(22) Filed: Aug. 20, 2021

(65) Prior Publication Data

US 2022/0070799 A1    Mar. 3, 2022

Related U.S. Application Data

(60) Provisional application No. 63/071,090, filed on Aug. 27, 2020.

(51) Int. Cl.
| | |
|---|---|
| *H04W 56/00* | (2009.01) |
| *H04J 13/00* | (2011.01) |
| *H04W 72/20* | (2023.01) |
| *H04W 92/18* | (2009.01) |

(52) U.S. Cl.
CPC ....... *H04W 56/001* (2013.01); *H04J 13/0029* (2013.01); *H04W 72/20* (2023.01); *H04W 92/18* (2013.01)

(58) Field of Classification Search
None
See application file for complete search history.

(56) References Cited

U.S. PATENT DOCUMENTS

| | | | |
|---|---|---|---|
| 2016/0112979 A1* | 4/2016 | Takano | H04W 72/1215 370/336 |
| 2020/0092685 A1* | 3/2020 | Fehrenbach | H04W 72/23 |
| 2020/0120625 A1* | 4/2020 | Park | H04W 4/40 |
| 2020/0153574 A1* | 5/2020 | Shin | H04W 4/40 |
| 2020/0383055 A1* | 12/2020 | Cai | H04W 72/51 |
| 2021/0127253 A1* | 4/2021 | Fakoorian | H04W 8/005 |
| 2021/0235401 A1* | 7/2021 | Yuan | H04L 5/0048 |
| 2021/0352623 A1* | 11/2021 | Wang | H04W 72/0453 |
| 2021/0377893 A1* | 12/2021 | Khoryaev | H04L 5/0053 |

(Continued)

OTHER PUBLICATIONS

K. Manolakis and W. Xu, "Time Synchronization for Multi-Link D2D/V2X Communication," 2016 IEEE 84th Vehicular Technology Conference (VTC-Fall), Montreal, QC, Canada, 2016, pp. 1-6, doi: 10.1109/VTCFall.2016.7881579. (Year: 2016).*

*Primary Examiner* — Otis L Thompson, Jr.
(74) *Attorney, Agent, or Firm* — Procopio, Cory, Hargreaves & Savitch LLP

(57) ABSTRACT

Aspects presented herein relate to methods and devices for wireless communication including an apparatus, e.g., a UE. In some aspects, the apparatus may determine a timing synchronization procedure with at least one sidelink UE. The apparatus may also configure a timing synchronization signal associated with the timing synchronization procedure, the timing synchronization signal including at least one of a signal bandwidth or a signal location. The apparatus may also transmit, to the at least one sidelink UE, the timing synchronization signal associated with the timing synchronization procedure.

30 Claims, 15 Drawing Sheets

(56) References Cited

U.S. PATENT DOCUMENTS

| | | | |
|---|---|---|---|
| 2022/0022168 A1* | 1/2022 | Wang | H04W 72/52 |
| 2022/0132460 A1* | 4/2022 | Shimoda | G01S 5/021 |
| 2022/0140967 A1* | 5/2022 | Khoryaev | H04L 5/0012 |
| | | | 375/220 |
| 2022/0159590 A1* | 5/2022 | Lee | H04L 5/0094 |
| 2022/0166582 A1* | 5/2022 | Hwang | H04L 5/0051 |
| 2022/0240209 A1* | 7/2022 | Zhao | H04W 56/001 |
| 2023/0051721 A1* | 2/2023 | Fong | H04L 5/00 |
| 2023/0059876 A1* | 2/2023 | Pan | H04W 76/27 |
| 2023/0063472 A1* | 3/2023 | Freda | H04W 76/28 |
| 2023/0080162 A1* | 3/2023 | Ghanbarinejad | H04W 52/16 |
| 2023/0100135 A1* | 3/2023 | Liu | H04B 7/0695 |
| | | | 370/252 |
| 2023/0103523 A1* | 4/2023 | Lee | H04W 76/14 |
| | | | 370/329 |
| 2023/0171719 A1* | 6/2023 | Ko | G08G 1/00 |
| | | | 370/503 |
| 2023/0171745 A1* | 6/2023 | Ghanbarinejad | H04W 76/19 |
| | | | 370/329 |
| 2023/0262729 A1* | 8/2023 | Kim | H04W 56/0045 |
| | | | 370/329 |

* cited by examiner

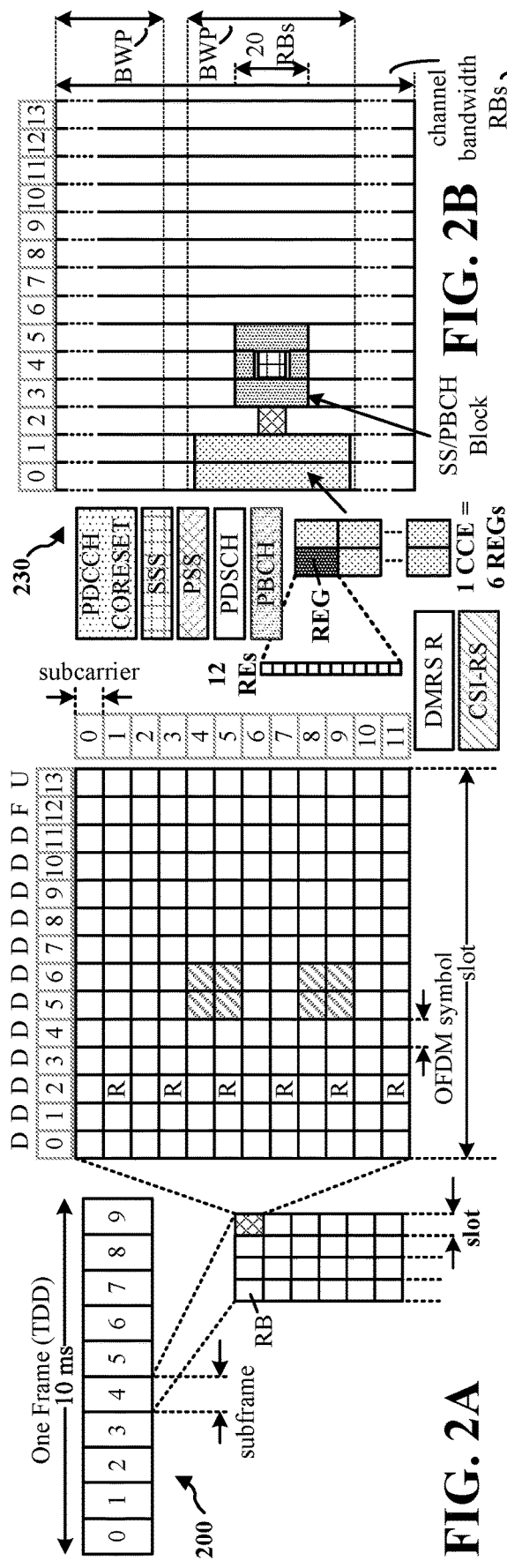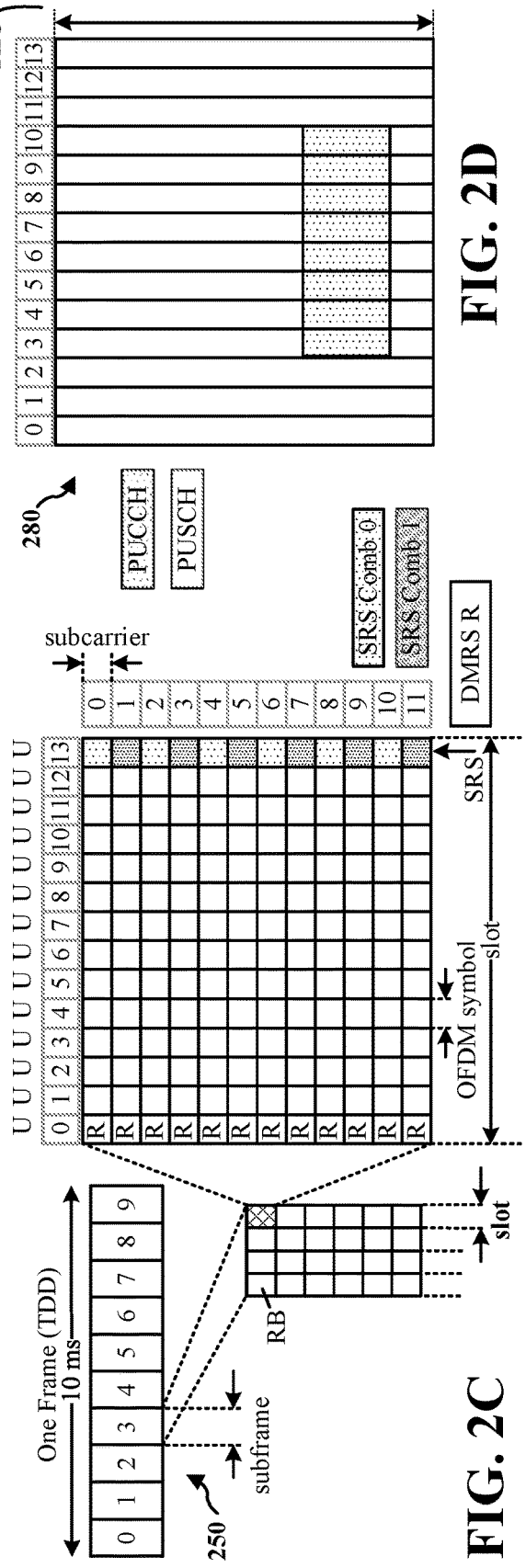
FIG. 2A  FIG. 2B  FIG. 2C  FIG. 2D

RECEIVER TIMING ADJUSTMENT

CROSS REFERENCE TO RELATED APPLICATION(S)

This application claims the benefit of U.S. Provisional Application Ser. No. 63/071,090, entitled "METHODS AND APPARATUS FOR RECEIVER TIMING ADJUSTMENT" and filed on Aug. 27, 2020, which is expressly incorporated by reference herein in its entirety.

TECHNICAL FIELD

The present disclosure relates generally to communication systems, and more particularly, to sidelink timing in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced (pc) mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may determine a timing synchronization procedure with at least one sidelink UE. The apparatus may also determine at least one of a signal bandwidth or a signal location of a timing synchronization signal. Additionally, the apparatus may configure a timing synchronization signal associated with the timing synchronization procedure, the timing synchronization signal including at least one of a signal bandwidth or a signal location. The apparatus may also transmit, to the at least one sidelink UE, the timing synchronization signal associated with the timing synchronization procedure. Further, the apparatus may receive feedback from the at least one sidelink UE, the feedback corresponding to the timing synchronization procedure. The apparatus may also adjust the timing synchronization procedure based on the feedback from the at least one sidelink UE.

In another aspect of the disclosure, a method, a computer-readable medium, and an apparatus are provided. The apparatus may be a user equipment (UE). The apparatus may determine a timing synchronization procedure with at least one sidelink UE. The apparatus may also receive, from the at least one sidelink UE, a timing synchronization signal associated with the timing synchronization procedure, the timing synchronization signal including at least one of a signal bandwidth or a signal location. The apparatus may also transmit feedback to the at least one sidelink UE, the feedback corresponding to the timing synchronization procedure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
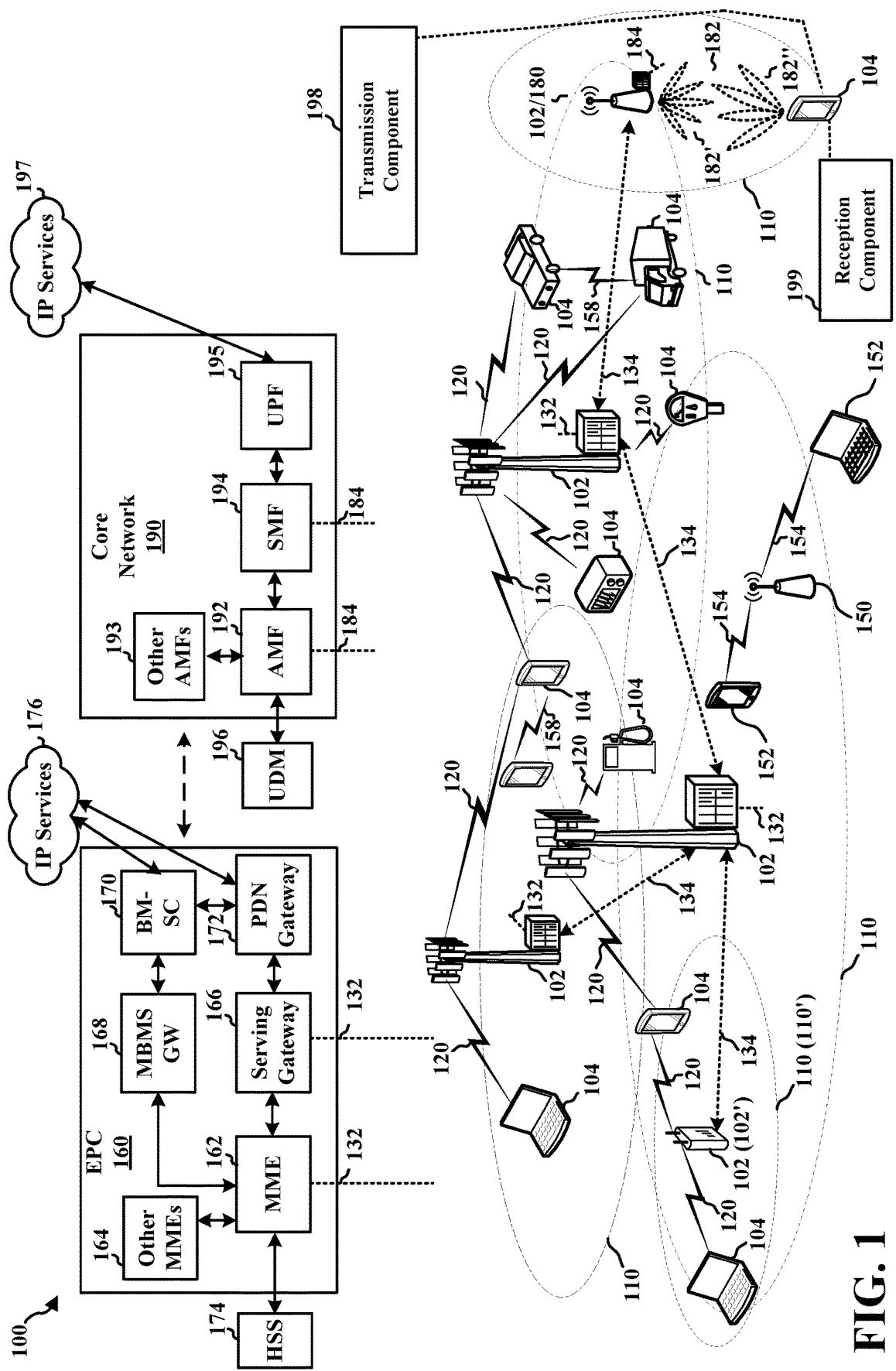
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a transmission component 198 configured to determine a timing synchronization procedure with at least one sidelink UE. Transmission component 198 may also be configured to determine at least one of a signal bandwidth or a signal location of a timing synchronization signal. Transmission component 198 may also be configured to configure a timing synchronization signal associated with the timing synchronization procedure, the timing synchronization signal including at least one of a signal bandwidth or a signal location. Transmission component 198 may also be configured to transmit, to the at least one sidelink UE, the timing synchronization signal associated with the timing synchronization procedure. Transmission component 198 may also be configured to receive feedback from the at least one sidelink UE, the feedback corresponding to the timing synchronization procedure. Transmission component 198 may also be configured to adjust the timing synchronization procedure based on the feedback from the at least one sidelink UE.

Referring again to FIG. 1, in certain aspects, the UE 104 may include a reception component 199 configured to determine a timing synchronization procedure with at least one sidelink UE. Reception component 199 may also be configured to receive, from the at least one sidelink UE, a timing synchronization signal associated with the timing synchronization procedure, the timing synchronization signal including at least one of a signal bandwidth or a signal location. Reception component 199 may also be configured to transmit feedback to the at least one sidelink UE, the feedback corresponding to the timing synchronization procedure.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
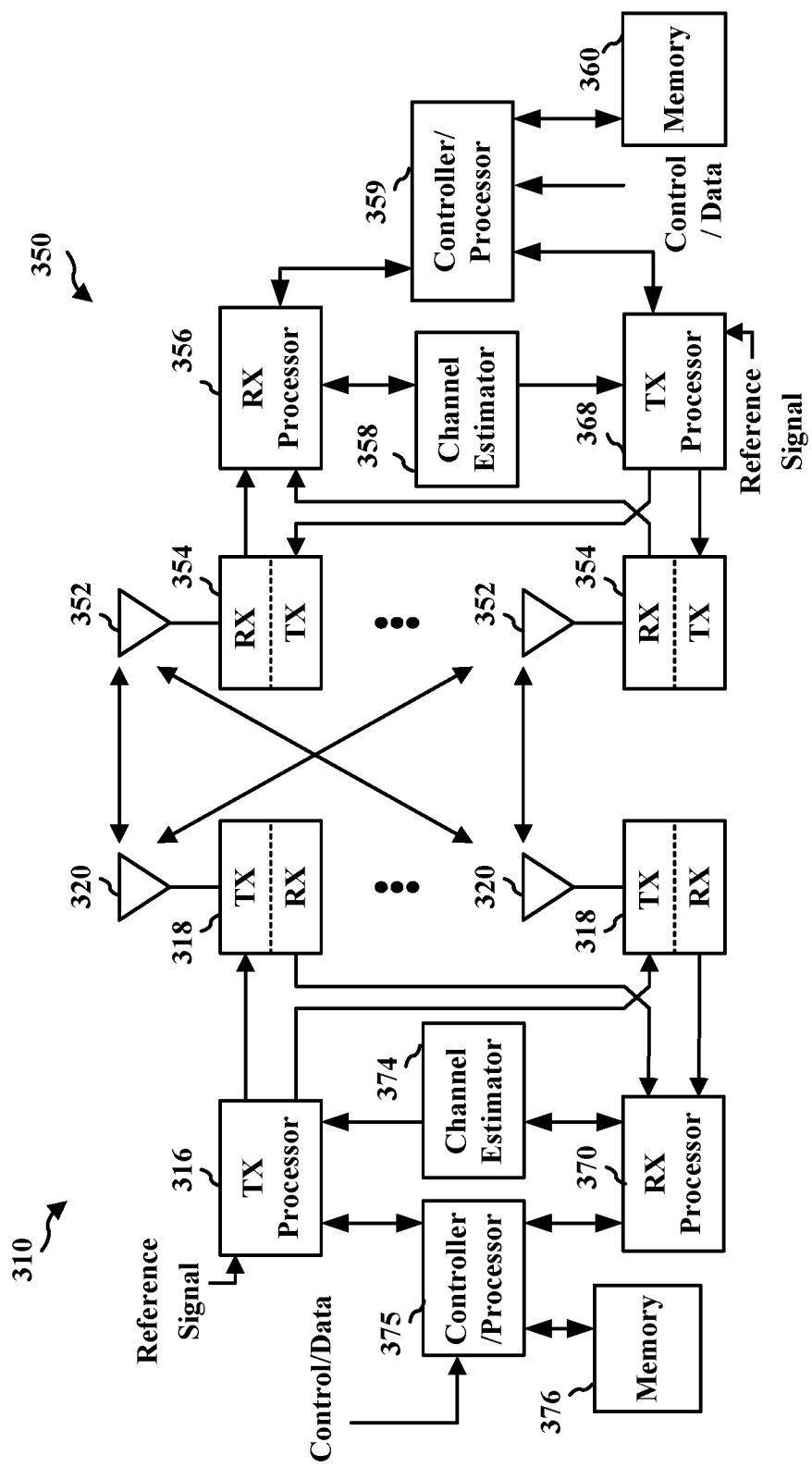
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 368, the RX processor 356, and the controller/processor 359 may be configured to perform aspects in connection with 199 of FIG. 1.

Some aspects of wireless communication, e.g., sidelink communication, may include a number of different timing procedures. In some aspects of sidelink communication, UEs may utilize downlink timing. For example, UEs may receive downlink synchronization signal blocks (SSBs) or secondary synchronization signals (SSSs) from base stations. This downlink timing may be utilized as sidelink (SL) transmission timing by the UE. Also, in some aspects of sidelink communication, e.g., LTE device-to-device (D2D) communication, the physical sidelink shared channel (PSSCH) may use uplink timing in certain modes, e.g., mode 1.

Figure 4:
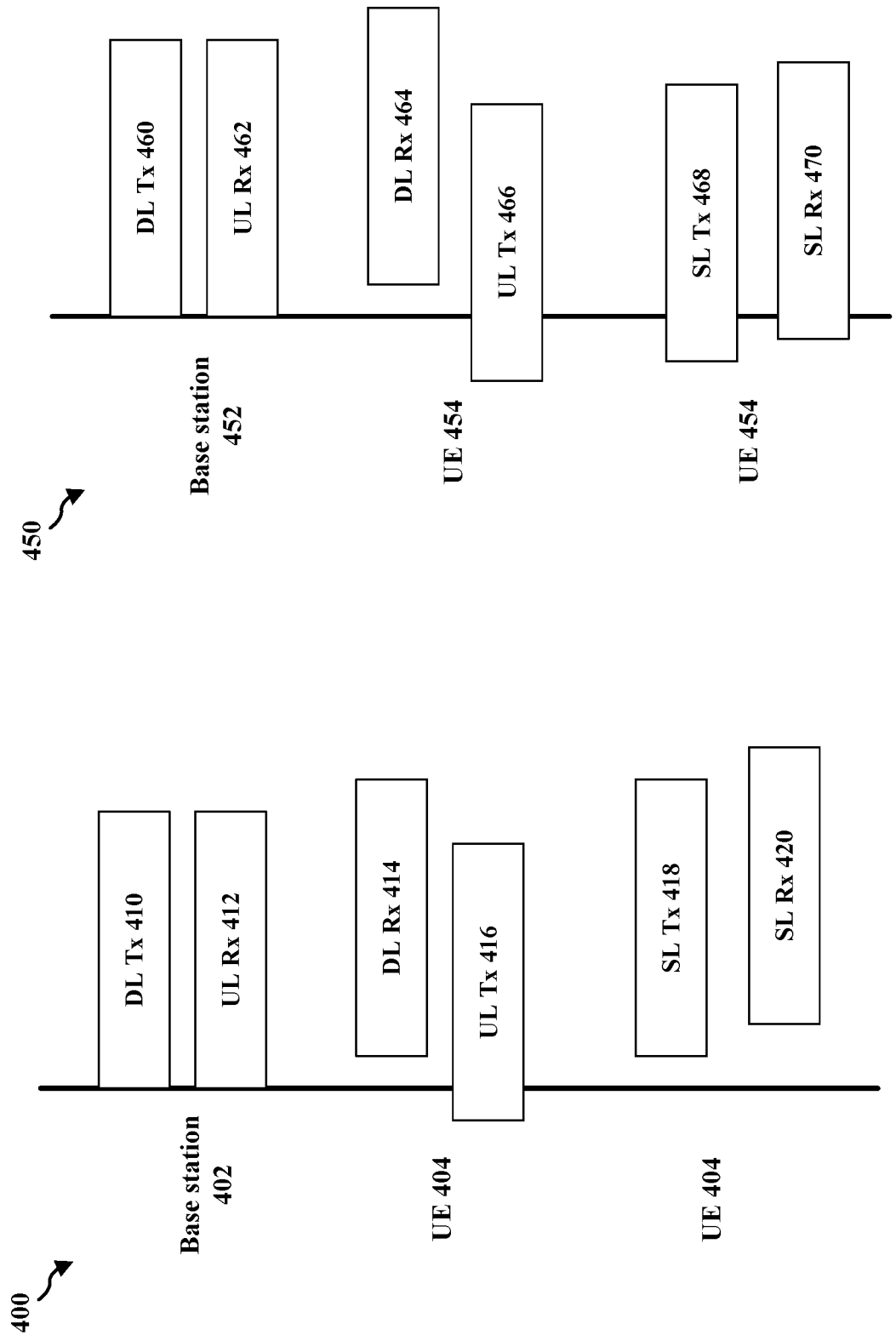
FIG. 4A is a diagram illustrating example downlink timing between a base station and a UE.
FIG. 4B is a diagram illustrating example uplink timing between a base station and a UE.

FIG. 4A is a diagram 400 illustrating example downlink timing between a base station 402 and a UE 404. As illustrated in FIG. 4A, diagram 400 includes downlink (DL) transmission (Tx) 410 and uplink (UL) reception (Rx) 412 for base station 402. Diagram 400 also includes DL Rx 414 and UL Tx 416 for UE 404. Further, UE 404 includes sidelink (SL) Tx 418 and SL Rx 420. As shown in FIG. 4A, the base station 402 may send the downlink transmission timing to the UE 404. The UE 404 may then utilize the downlink transmission timing for sidelink transmission timing.

FIG. 4B is a diagram 450 illustrating example uplink timing between a base station 452 and a UE 454. As illustrated in FIG. 4B, diagram 450 includes DL Tx 460 and UL Rx 462 for base station 452. Diagram 450 also includes DL Rx 464 and UL Tx 466 for UE 454. Also, UE 454 includes SL Tx 468 and SL Rx 470. As shown in FIG. 4B, the UE 454 transmits its uplink timing in advance of the received downlink timing. As such, the UE 454 transmits the uplink before the downlink timing is received, so the UE 454 may utilize the uplink timing for the sidelink transmission timing.

Some aspects of sidelink communication may utilize receiver timing in certain modes of sidelink communication, e.g., mode 2. For instance, in mode 2, the sidelink receiver may decode the sidelink control information (SCI), e.g., SCI-01, in order to obtain SL resource allocation information. By doing so, a sidelink UE may determine how congested communication may be, as well as a resource selection. Additionally, SCI-01 from a SL transmitter UE, in contrast to a receiver UE, may include a different arrival time for the SCI.

Figure 5:
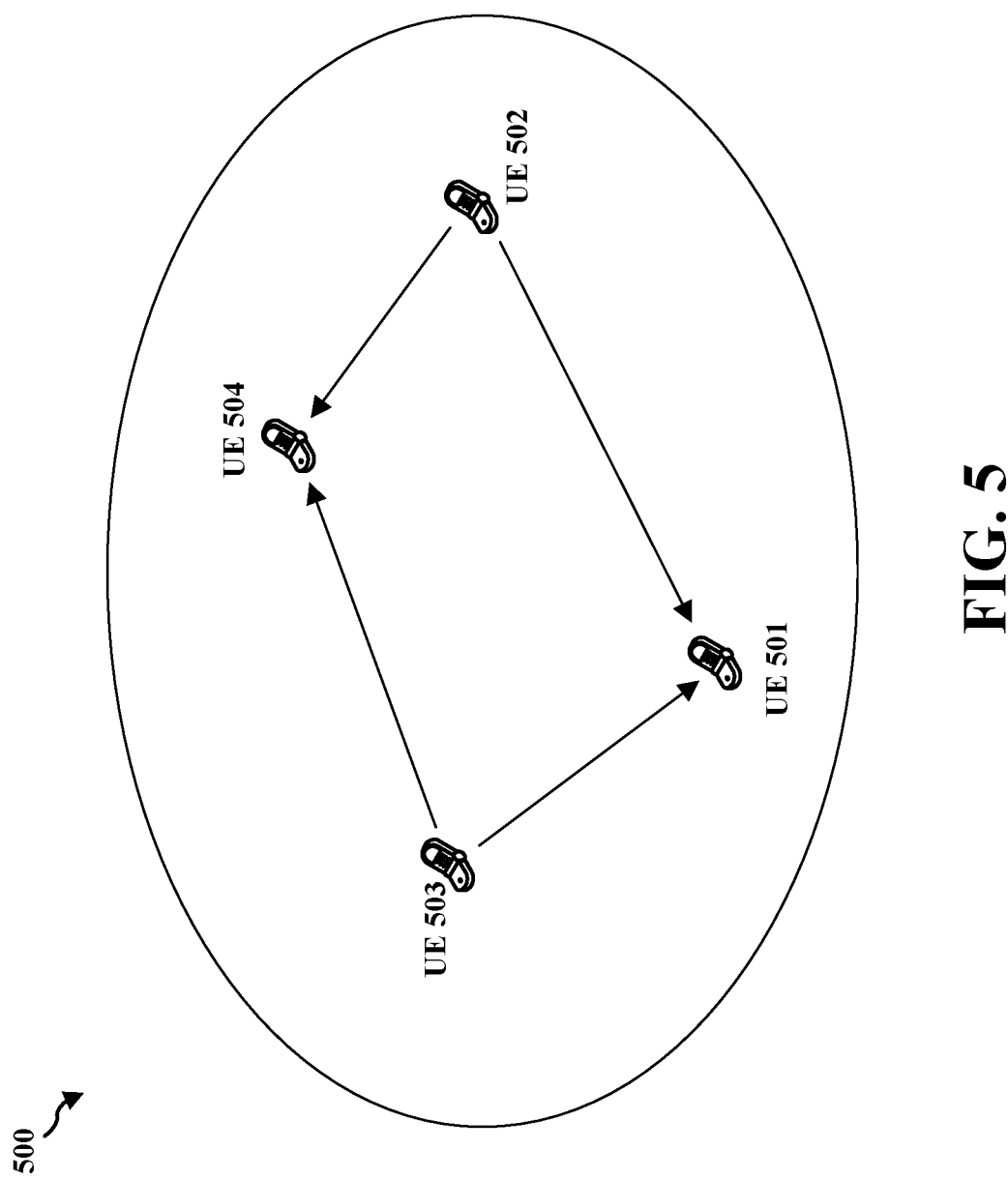
FIG. 5 is a diagram illustrating example sidelink communication between multiple UEs.

FIG. 5 is a diagram 500 illustrating example sidelink communication between multiple UEs, e.g., UE 501, UE 502, UE 503, and UE 504. As shown in FIG. 5, UE 502 sends SL communication to UE 501. Also, UE 503 sends SL communication to UE 504. UE 503 and UE 502 may receive sidelink timing from different base stations, such that they may have different sidelink transmission (Tx) timing. This may also be based on different propagation delays. Based on this, the sidelink timing may be misaligned at UE 501. As such, UE 501 may need to decode the SCI, e.g., SCI-01, from both UE 502 and UE 503.

As indicated in FIG. 5, different sidelink timing arrivals times may result in a number of issues. For instance, if the UE utilizes one receiver timing window, and if the multiple sidelink communications are in different timing windows, the UE may not receive each of the sidelink communications. In some aspects, the receiver timing window may start at a receiver time and extend to a certain number of symbols, e.g., 10 symbols. So if there is misalignment in the receiver timing window, there may be a degradation in the communication performance.

Figure 6:
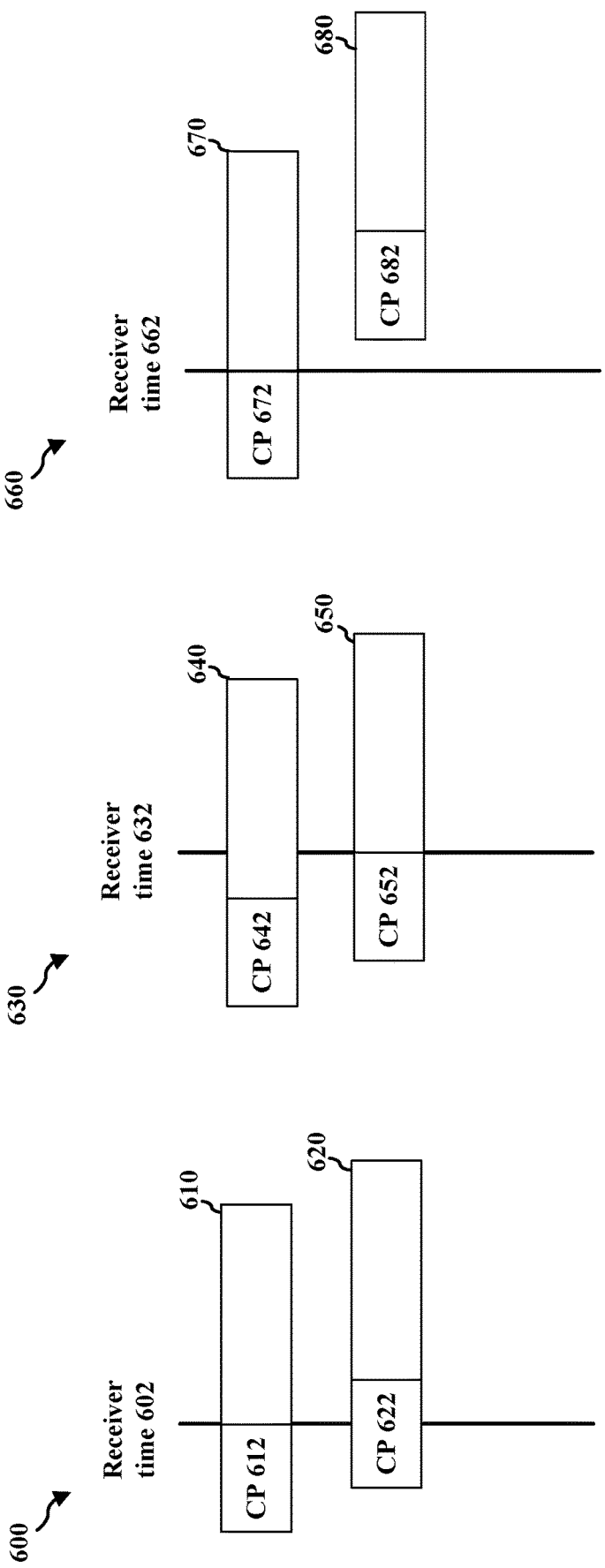
FIGS. 6A, 6B, and 6C are diagrams illustrating example receiving timing windows in accordance with one or more techniques of the present disclosure.

FIGS. 6A, 6B, and 6C are diagrams 600, 630, and 660, respectively, illustrating example receiving timing windows. FIGS. 6A, 6B, and 6C display that receiver timing windows may be misaligned between UEs, which may cause a portion of a signal to be missed by a UE. As shown in FIG. 6A, diagram 600 includes receiver time 602, first signal 610, cyclic prefix (CP) 612, second signal 620, and CP 622. FIG. 6A depicts one example of inter-symbol interference (ISI) for second signal 620. For instance, after the CP 612 of the first signal 610, the UE may receive the first signal 610 at the receiver time 602. However, as the CP 622 of the second signal 620 arrives at the same time as the first signal 610, the UE may receive ISI for the second signal 620.

As shown in FIG. 6B, diagram 630 includes receiver time 632, first signal 640, CP 642, second signal 650, and CP 652. FIG. 6B depicts that part of the first signal 640 may be missed. For instance, after the CP 652 of the second signal 650, the second signal 650 is received at the receiver time 632. However, a portion of the first signal 640 arrives before the receiver time 632, so that portion of the first signal 640 may be missed.

As shown in FIG. 6C, diagram 660 includes receiver time 662, first signal 670, CP 672, second signal 680, and CP 682. FIG. 6C depicts that part of the second signal 680 may be missed. For instance, after the CP 672 of the first signal 670, the first signal 670 is received at the receiver time 662. However, a portion of the second signal 680 arrives after the receiver window, so that portion of the second signal 680 may be missed by the UE.

In some aspects of wireless communication, e.g., new radio (NR) vehicle-to-everything (V2X) communication, a demodulation reference signal (DM-RS) in a physical sidelink control channel (PSCCH) may be used to perform a timing estimation. Additionally, a DM-RS in a PSCCH may be used as a fast Fourier transform (FFT) window adjustment, e.g., depending on a UE capability. In some aspects, in a second frequency range (FR2), a CP may be short, e.g., 0.6 μs, for a subcarrier spacing (SCS) of 120 kHz. For higher frequency ranges, the CP may be even shorter.

In some aspects, a base station synchronization difference may be within a certain time, e.g., 1.5 μs, which may be less than 1 μs for multiple transmit receive point (mTRP) communication. For out-of-coverage (OOC) cases, different UEs may use a different synchronization reference (syncRef) UE, where the timing difference of the syncRef UE may extend beyond 1.5 μs. For example, in some instances, there may be two 'island clusters' of OOC UEs that have separate timings, and the islands may be close to one another. As such, using a PSCCH DM-RS for a timing estimation may not work when the timing difference is greater than a threshold (i.e., the timing difference is large). So if a timing difference is large, the PSCCH DM-RS may not provide an accurate timing estimation.

In some aspects, a receiver UE may obtain a receiver timing from a detected SSB from a transmit UE. However, the SSB may not be sent frequently enough, and the SSB transmit time may not be the same as a SL data transmit time when a SL timing advance (TA) is applied. Accordingly, there may be a large amount of FFT windows for each possible SSB from each potential transmit UE, which may not be limited to transmit UEs in the same slot as the receiver UE.

Based on the above, it may be beneficial to add a timing synchronization signal or preamble before SCI, e.g., SCI-01, or a PSCCH. It may also be beneficial to add a timing synchronization signal or preamble after the SCI, e.g., SCI-01, or a PSCCH. In these instances, a timing synchronization signal or preamble after the SCI may correspond to a compatibility with certain types of UEs, e.g., legacy UEs.

Aspects of the present disclosure may add a timing synchronization preamble or signal before SCI, e.g., SCI-01, or a PSCCH. For instance, aspects of the present disclosure may add a timing synchronization preamble or signal after the SCI, e.g., SCI-01, or a PSCCH. In these instances, aspects of the present disclosure may correspond to a compatibility with certain types of UEs, e.g., legacy UEs. By including timing synchronization signals, a UE may be able to more easily determine a timing synchronization. This may also result in the UE having a simpler adjustment of a receiver timing window.

Figure 7:
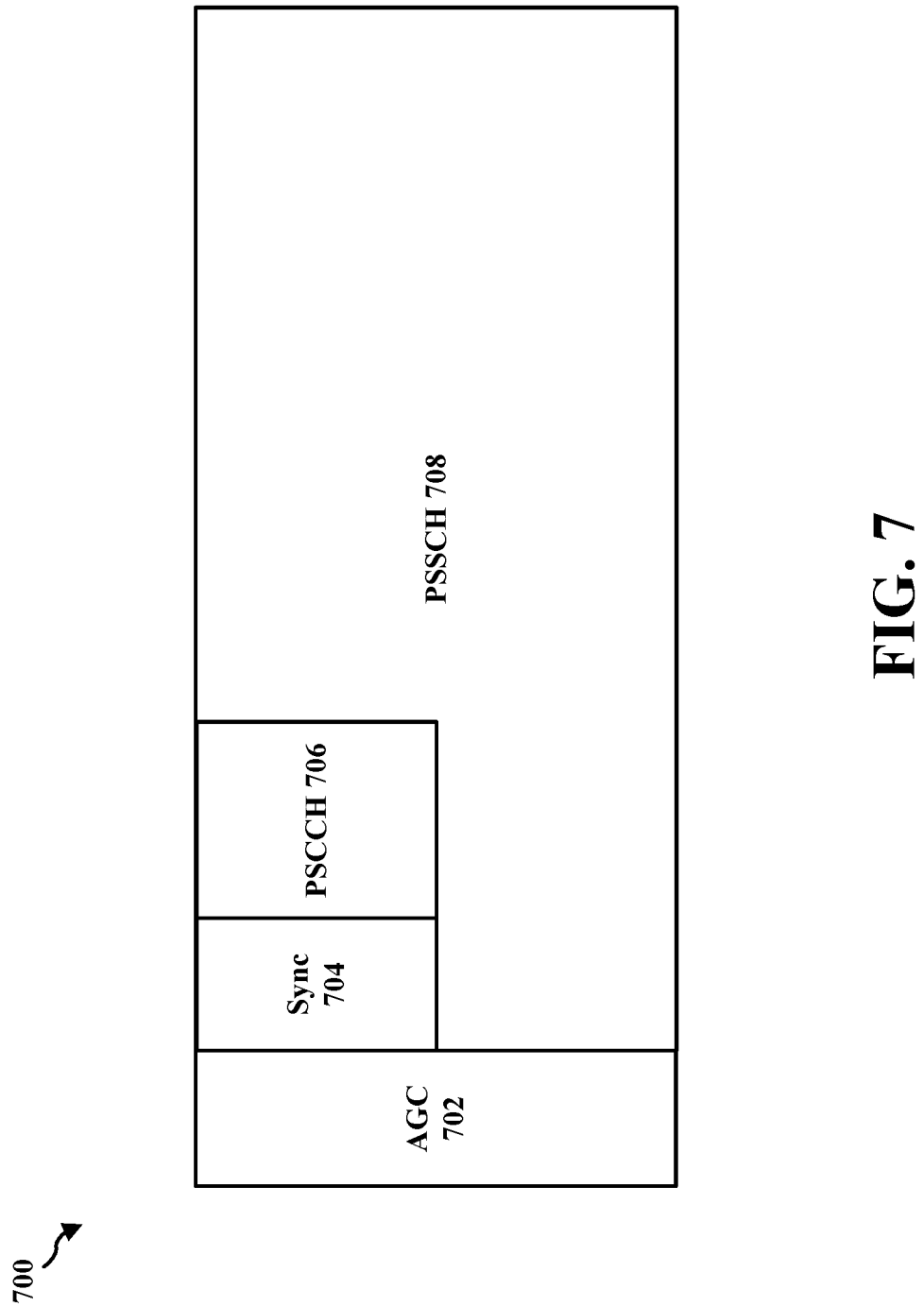
FIG. 7 is a diagram illustrating an example receiver timing in accordance with one or more techniques of the present disclosure.

FIG. 7 is a diagram 700 illustrating a receiver timing in accordance with one or more techniques of the present disclosure. As shown in FIG. 7, diagram 700 includes automatic gain control (AGC) 702, timing synchronization signal or preamble 704, PSCCH 706, and PSSCH 708. FIG. 7 illustrates that timing synchronization signal 704 may be included before PSCCH 706 or SCI, e.g., SCI-01, and may be partially overlapping with the PSSCH 708 (e.g., may be prior to a portion of the PSSCH 708 while overlapping or concurrent with at least another portion of the PSSCH 708).

Figure 8:
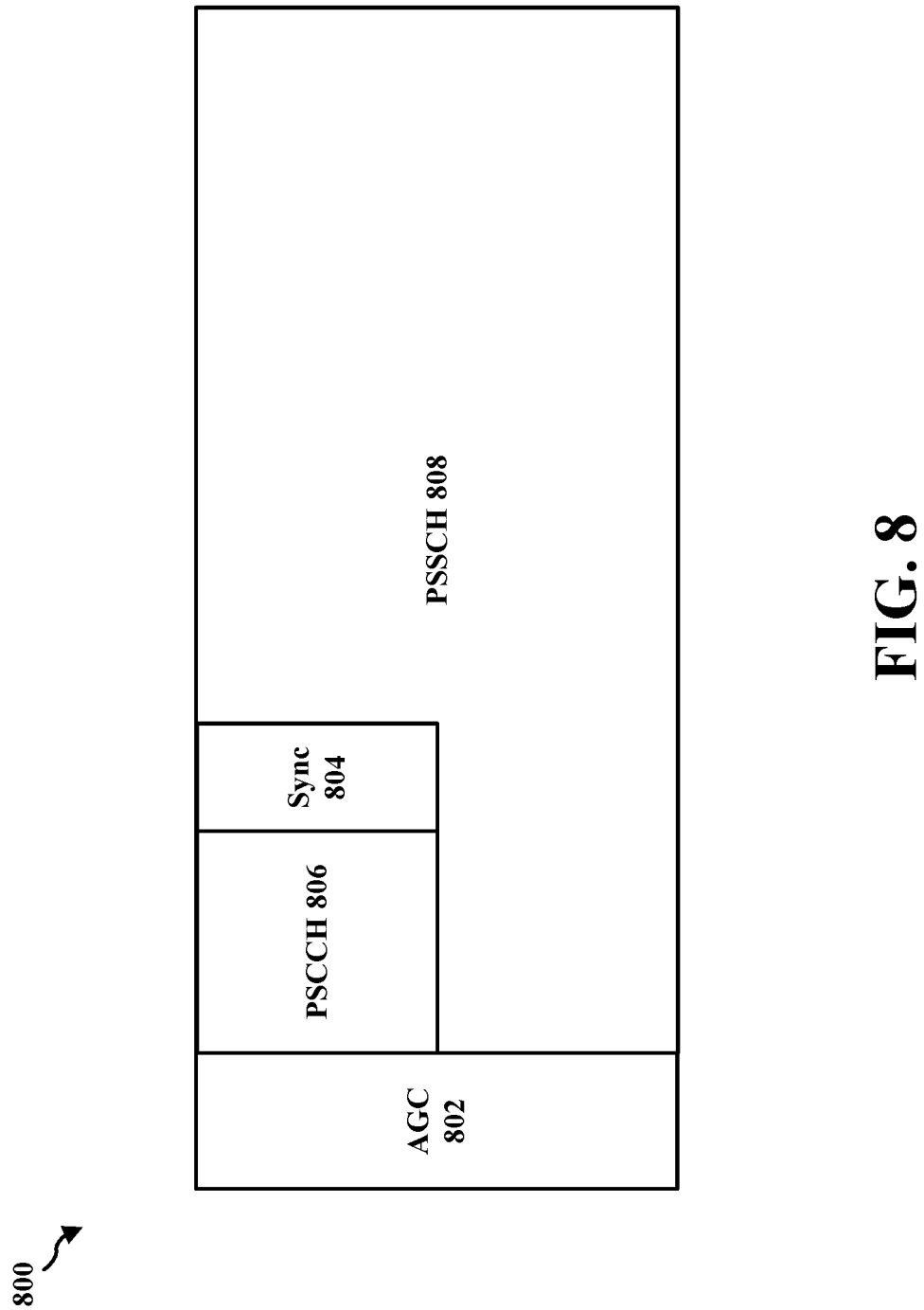
FIG. 8 is a diagram illustrating an example receiver timing in accordance with one or more techniques of the present disclosure.

FIG. 8 is a diagram 800 illustrating a receiver timing in accordance with one or more techniques of the present disclosure. As illustrated in FIG. 8, diagram 800 includes AGC 802, timing synchronization signal or preamble 804, PSCCH 806, and PSSCH 808. FIG. 8 is similar to FIG. 7, with the exception of the order of timing synchronization signal 804 and PSCCH 806. Indeed, FIG. 8 depicts that timing synchronization signal 804 may be included after PSCCH 806 or SCI, e.g., SCI-01, and may be partially overlapping with the PSSCH 808 (e.g., may be prior to a portion of the PSSCH 808 while overlapping or concurrent with at least another portion of the PSSCH 808).

As displayed in FIGS. 7 and 8, there are a number of ways that aspects of the present disclosure may organize a timing synchronization signal. Additionally, there may be a number of ways to determine a bandwidth of a timing synchronization signal. In some aspects, the same bandwidth may be utilized for all possible configurations of SCI or SCI-01, e.g., 10 RBs. For instance, this may correspond to the minimum of all possible choices of SCI-01. Additionally, the same bandwidth may be utilized as the corresponding SCI-01. So aspects of the present disclosure may determine the amount of RBs for the corresponding SCI-01, and then use the same number of RBs for the timing synchronization signal.

Aspects of the present disclosure may also determine a timing synchronization signal sequence. In some instances, aspects of the present disclosure may use the same sequence as an NR primary synchronization signal (PSS), e.g., a maximum length sequence (m-sequence) of 127 values. Also, aspects of the present disclosure may use the same sequence as an NR secondary synchronization signal (SSS), e.g., a Gold sequence of length 127. For example, the timing synchronization signal may be more than 10 RBs. For a timing synchronization signal including a bandwidth of 10 RBs, aspects of the present disclosure may utilize a shorter m-sequence or Gold sequence.

Aspects of the present disclosure may use multiple sequences for the timing synchronization signal. By doing so, aspects of the present disclosure may differentiate SCI or SCI-01 of frequency division multiplexed (FDMed) sidelink transmitters. In some instances, aspects of the present disclosure may utilize an extra RRC signal to configure the synchronization sequence. In some aspects, the present disclosure may map a UE identifier (ID) to the sequence, e.g., a UE ID modular to the total number of sequences. Also, aspects of the present disclosure may map an RB location to the sequence. Aspects of the present disclosure may further reduce a number of possible receiving FFT windows.

In some aspects, the present disclosure may use a single common sequence for the synchronization signal for all SL UEs. Aspects of the present disclosure may also reduce a RRC configuration signal. Additionally, aspects of the present disclosure may not differentiate the synchronization signal from different SL transmitters or the same SL transmitter with multiple path or multi-path communication.

Figure 9:
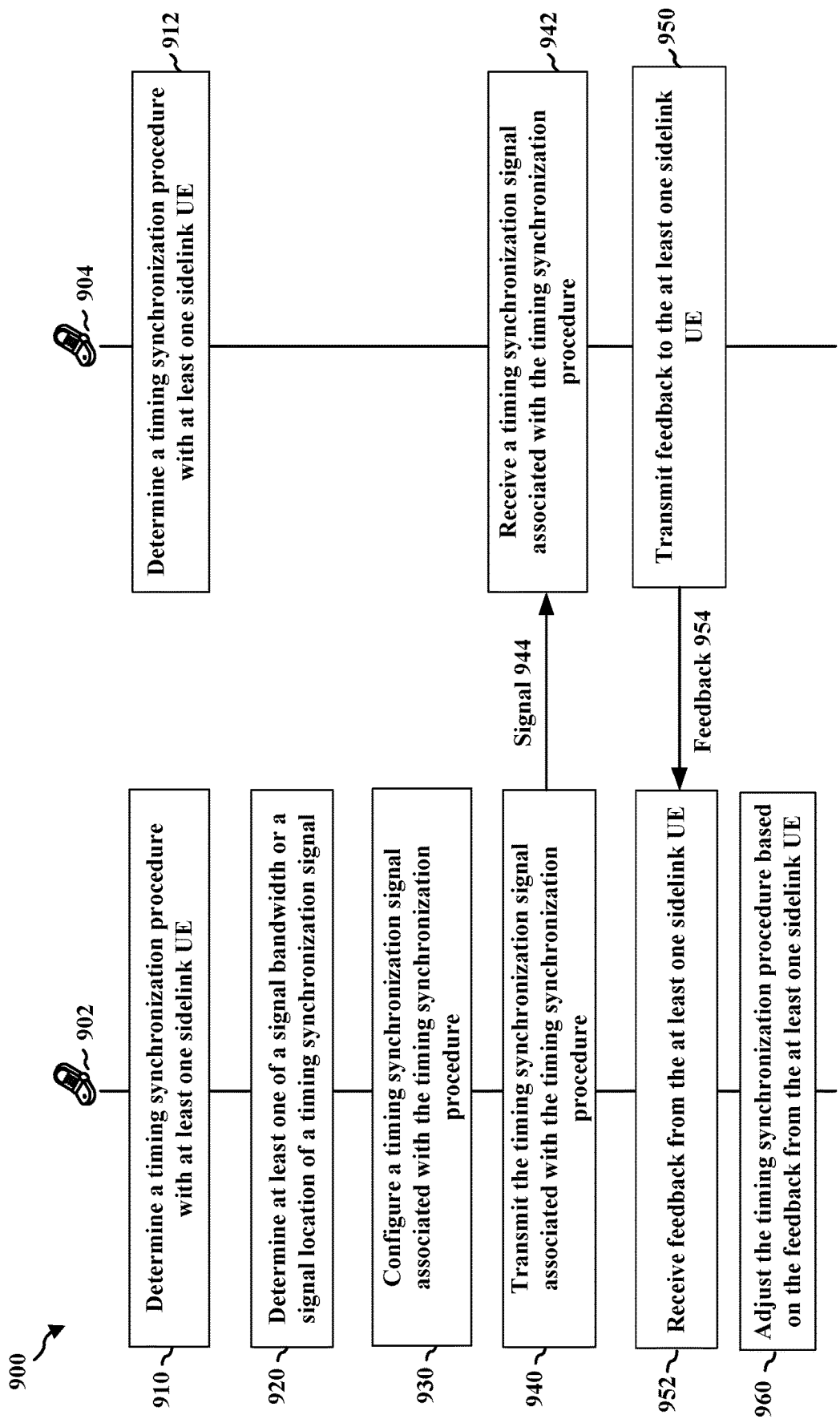
FIG. 9 is a diagram illustrating example communication between a UE and a UE in accordance with one or more techniques of the present disclosure.

FIG. 9 is a diagram 900 illustrating example communication between a UE 902, e.g., a transmitter SL UE, and a UE 904, e.g., a receiver SL UE.

At 910, UE 902 may determine a timing synchronization procedure with at least one sidelink UE, e.g., UE 904. At 912, UE 904 may determine a timing synchronization procedure with at least one sidelink UE, e.g., UE 902.

At 920, UE 902 may determine at least one of a signal bandwidth or a signal location of a timing synchronization signal. In some aspects, at least one of the signal bandwidth or the signal location may correspond to one or more resource blocks (RBs).

At 930, UE 902 may configure a timing synchronization signal associated with the timing synchronization procedure, the timing synchronization signal including at least one of a signal bandwidth or a signal location.

In some instances, the timing synchronization signal may be associated with at least one synchronization sequence. Also, a UE identifier (ID) may be mapped to the at least one synchronization sequence. The signal location may also be mapped to the at least one synchronization sequence. The signal location may correspond to a resource block (RB) location. Further, the at least one synchronization sequence may be associated with the at least one sidelink UE. The at least one synchronization sequence may be at least one of a maximum length sequence (m-sequence) or a Gold sequence. Moreover, the at least one synchronization sequence may be configured via radio resource control (RRC) signaling.

At 940, UE 902 may transmit, to at least one sidelink UE, e.g., UE 904, the timing synchronization signal associated with the timing synchronization procedure, e.g., signal 944.

At 942, UE 904 may receive, from at least one sidelink UE, e.g., UE 902, a timing synchronization signal associated with the timing synchronization procedure, e.g., signal 944, the timing synchronization signal may include at least one of a signal bandwidth or a signal location.

In some aspects, the timing synchronization signal may be transmitted before sidelink control information (SCI) associated with a physical sidelink control channel (PSCCH). Also, the timing synchronization signal may be transmitted after SCI associated with a PSCCH.

At 950, UE 904 may transmit feedback, e.g., feedback 954, to the at least one sidelink UE, e.g., UE 902, the feedback corresponding to the timing synchronization procedure. At 952, UE 902 may receive feedback, e.g., feedback 954, from the at least one sidelink UE, e.g., UE 904, the feedback corresponding to the timing synchronization procedure.

At 960, UE 902 may adjust the timing synchronization procedure based on the feedback from the at least one sidelink UE.

Figure 10:
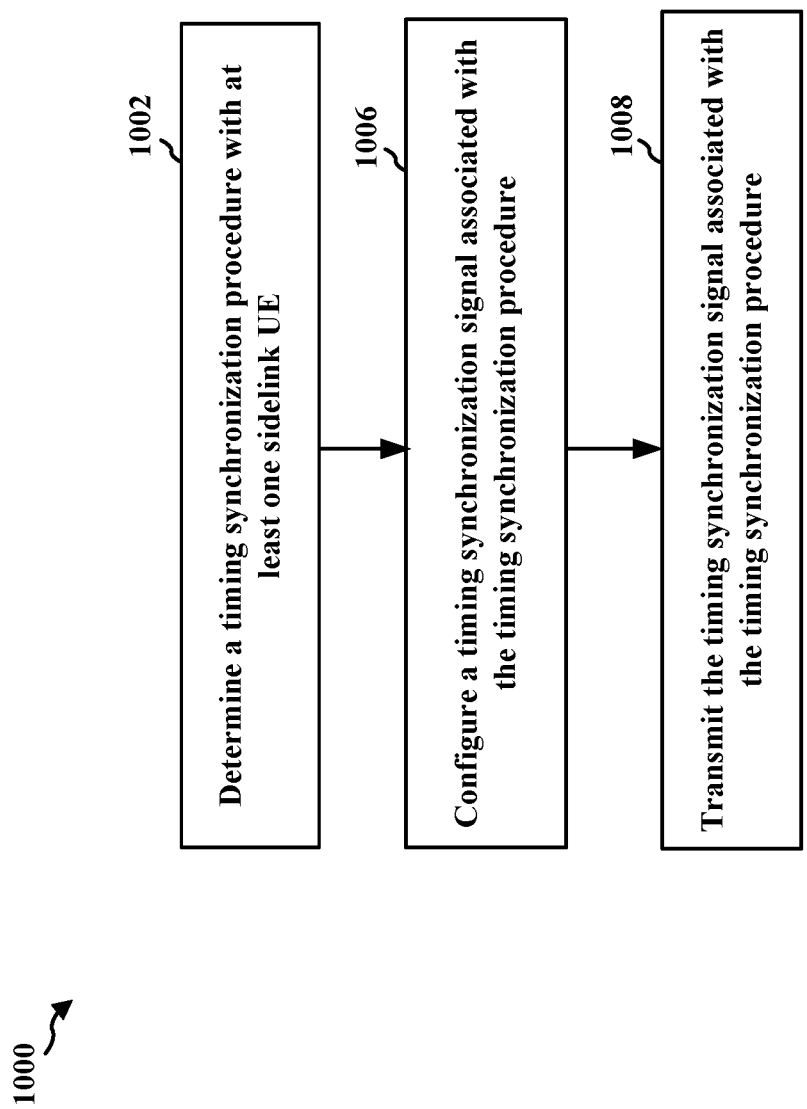
FIG. 10 is a flowchart of a method of wireless communication.

FIG. 10 is a flowchart 1000 of a method of wireless communication. The method may be performed by a UE or a component of a UE (e.g., the UE 104, 350, 902; the apparatus 1402; a processing system, which may include the memory 360 and which may be the entire UE or a component of the UE, such as the TX processor 368, the controller/processor 359, transmitter 354TX, antenna(s) 352, and/or the like). The methods described herein may provide a number of benefits, such as improving communication signaling, resource utilization, and/or power savings.

At 1002, the UE may determine a timing synchronization procedure with at least one sidelink UE, as described in connection with the examples in FIGS. 4A, 4B, 5, 6A, 6B, 6C, 7, 8, and 9. For example, UE 902 may determine a timing synchronization procedure with at least one sidelink UE, as described in connection with 910 in FIG. 9. Further, 1002 may be performed by determination component 1440 in FIG. 14.

At 1006, the UE may configure a timing synchronization signal associated with the timing synchronization procedure, the timing synchronization signal including at least one of a signal bandwidth or a signal location, as described in connection with the examples in FIGS. 4A, 4B, 5, 6A, 6B, 6C, 7, 8, and 9. For example, UE 902 may configure a timing synchronization signal associated with the timing synchronization procedure, the timing synchronization signal including at least one of a signal bandwidth or a signal location, as described in connection with 930 in FIG. 9. Further, 1006 may be performed by determination component 1440 in FIG. 14.

In some instances, the timing synchronization signal may be associated with at least one synchronization sequence, as described in connection with the examples in FIGS. 4A, 4B, 5, 6A, 6B, 6C, 7, 8, and 9. Also, a UE identifier (ID) may be mapped to the at least one synchronization sequence, as described in connection with the examples in FIGS. 4A, 4B, 5, 6A, 6B, 6C, 7, 8, and 9. The signal location may also be mapped to the at least one synchronization sequence, as described in connection with the examples in FIGS. 4A, 4B, 5, 6A, 6B, 6C, 7, 8, and 9. The signal location may correspond to a resource block (RB) location, as described in connection with the examples in FIGS. 4A, 4B, 5, 6A, 6B, 6C, 7, 8, and 9. Further, the at least one synchronization sequence may be associated with the at least one sidelink UE, as described in connection with the examples in FIGS. 4A, 4B, 5, 6A, 6B, 6C, 7, 8, and 9. The at least one synchronization sequence may be at least one of a maximum length sequence (m-sequence) or a Gold sequence, as described in connection with the examples in FIGS. 4A, 4B, 5, 6A, 6B, 6C, 7, 8, and 9. Moreover, the at least one synchronization sequence may be configured via radio resource control (RRC) signaling, as described in connection with the examples in FIGS. 4A, 4B, 5, 6A, 6B, 6C, 7, 8, and 9.

At 1008, the UE may transmit, to at least one sidelink UE, the timing synchronization signal associated with the timing synchronization procedure, as described in connection with the examples in FIGS. 4A, 4B, 5, 6A, 6B, 6C, 7, 8, and 9. For example, UE 902 may transmit, to at least one sidelink UE, the timing synchronization signal associated with the timing synchronization procedure, as described in connection with 940 in FIG. 9. Further, 1008 may be performed by determination component 1440 in FIG. 14.

In some aspects, the timing synchronization signal may be transmitted before sidelink control information (SCI) associated with a physical sidelink control channel (PSCCH), as described in connection with the examples in FIGS. 4A, 4B, 5, 6A, 6B, 6C, 7, 8, and 9. Also, the timing synchronization signal may be transmitted after SCI associated with a PSCCH, as described in connection with the examples in FIGS. 4A, 4B, 5, 6A, 6B, 6C, 7, 8, and 9.

Figure 11:
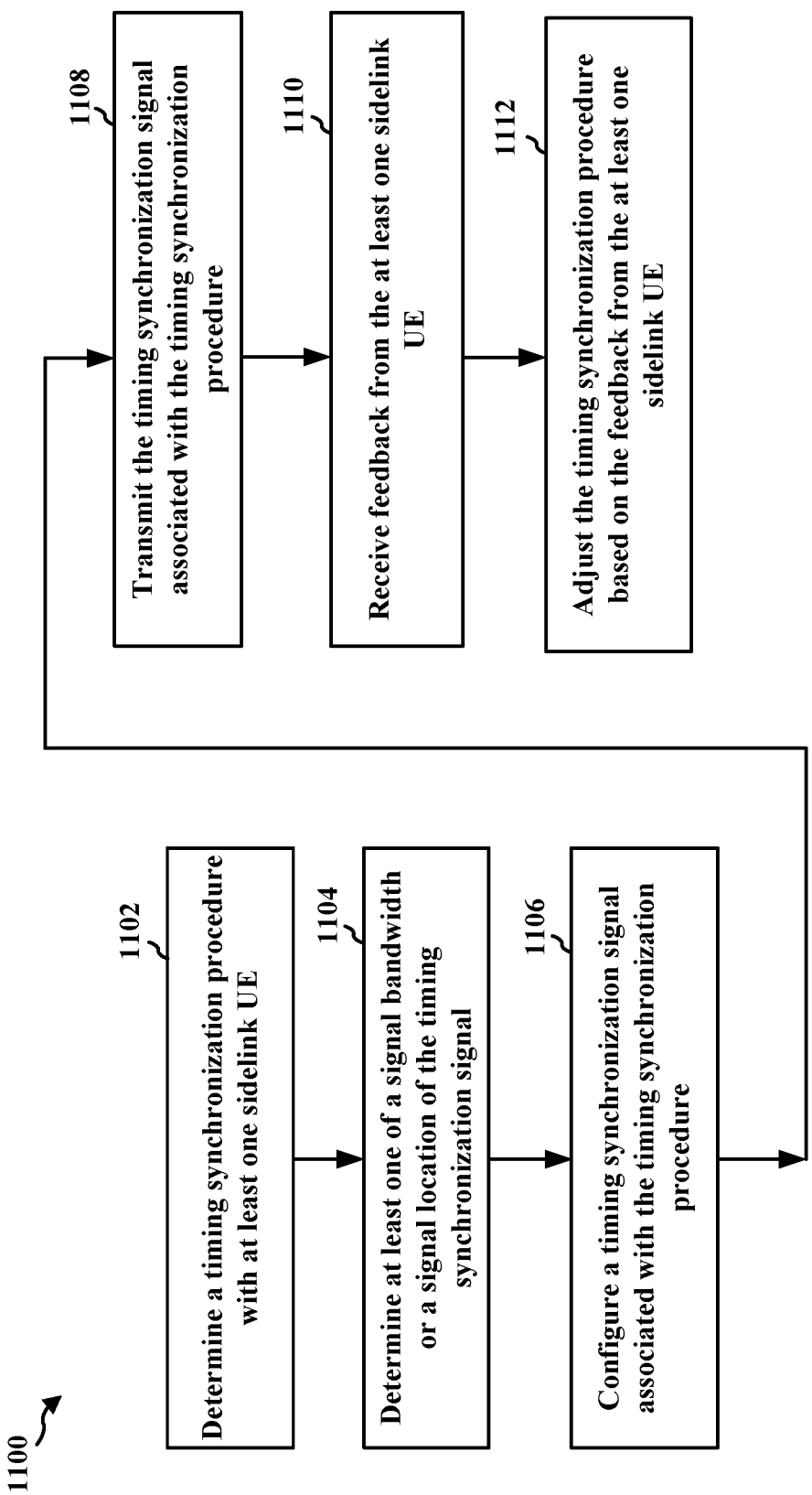
FIG. 11 is a flowchart of a method of wireless communication.

FIG. 11 is a flowchart 1100 of a method of wireless communication. The method may be performed by a UE or a component of a UE (e.g., the UE 104, 350, 902; the apparatus 1402; a processing system, which may include the memory 360 and which may be the entire UE or a component of the UE, such as the TX processor 368, the controller/processor 359, transmitter 354TX, antenna(s) 352, and/or the like). The methods described herein may provide a number of benefits, such as improving communication signaling, resource utilization, and/or power savings.

At 1102, the UE may determine a timing synchronization procedure with at least one sidelink UE, as described in connection with the examples in FIGS. 4A, 4B, 5, 6A, 6B, 6C, 7, 8, and 9. For example, UE 902 may determine a timing synchronization procedure with at least one sidelink UE, as described in connection with 910 in FIG. 9. Further, 1102 may be performed by determination component 1440 in FIG. 14.

At 1104, the UE may determine at least one of a signal bandwidth or a signal location of a timing synchronization signal, as described in connection with the examples in FIGS. 4A, 4B, 5, 6A, 6B, 6C, 7, 8, and 9. For example, UE 902 may determine at least one of a signal bandwidth or a signal location of a timing synchronization signal, as described in connection with 920 in FIG. 9. Further, 1104 may be performed by determination component 1440 in FIG. 14. In some aspects, at least one of the signal bandwidth or the signal location may correspond to one or more resource blocks (RBs), as described in connection with the examples in FIGS. 4A, 4B, 5, 6A, 6B, 6C, 7, 8, and 9.

At 1106, the UE may configure a timing synchronization signal associated with the timing synchronization procedure, the timing synchronization signal including at least one of a signal bandwidth or a signal location, as described in connection with the examples in FIGS. 4A, 4B, 5, 6A, 6B, 6C, 7, 8, and 9. For example, UE 902 may configure a timing synchronization signal associated with the timing synchronization procedure, the timing synchronization signal including at least one of a signal bandwidth or a signal location, as described in connection with 930 in FIG. 9. Further, 1106 may be performed by determination component 1440 in FIG. 14.

In some instances, the timing synchronization signal may be associated with at least one synchronization sequence, as described in connection with the examples in FIGS. 4A, 4B, 5, 6A, 6B, 6C, 7, 8, and 9. Also, a UE identifier (ID) may be mapped to the at least one synchronization sequence, as described in connection with the examples in FIGS. 4A, 4B, 5, 6A, 6B, 6C, 7, 8, and 9. The signal location may also be mapped to the at least one synchronization sequence, as described in connection with the examples in FIGS. 4A, 4B, 5, 6A, 6B, 6C, 7, 8, and 9. The signal location may correspond to a resource block (RB) location, as described in connection with the examples in FIGS. 4A, 4B, 5, 6A, 6B, 6C, 7, 8, and 9. Further, the at least one synchronization sequence may be associated with the at least one sidelink UE, as described in connection with the examples in FIGS. 4A, 4B, 5, 6A, 6B, 6C, 7, 8, and 9. The at least one synchronization sequence may be at least one of a maximum length sequence (m-sequence) or a Gold sequence, as described in connection with the examples in FIGS. 4A, 4B, 5, 6A, 6B, 6C, 7, 8, and 9. Moreover, the at least one synchronization sequence may be configured via radio resource control (RRC) signaling, as described in connection with the examples in FIGS. 4A, 4B, 5, 6A, 6B, 6C, 7, 8, and 9.

At 1108, the UE may transmit, to at least one sidelink UE, the timing synchronization signal associated with the timing synchronization procedure, as described in connection with the examples in FIGS. 4A, 4B, 5, 6A, 6B, 6C, 7, 8, and 9. For example, UE 902 may transmit, to at least one sidelink UE, the timing synchronization signal associated with the timing synchronization procedure, as described in connection with 940 in FIG. 9. Further, 1108 may be performed by determination component 1440 in FIG. 14.

In some aspects, the timing synchronization signal may be transmitted before sidelink control information (SCI) associated with a physical sidelink control channel (PSCCH), as described in connection with the examples in FIGS. 4A, 4B, 5, 6A, 6B, 6C, 7, 8, and 9. Also, the timing synchronization signal may be transmitted after SCI associated with a PSCCH, as described in connection with the examples in FIGS. 4A, 4B, 5, 6A, 6B, 6C, 7, 8, and 9.

At 1110, the UE may receive feedback from the at least one sidelink UE, the feedback corresponding to the timing synchronization procedure, as described in connection with the examples in FIGS. 4A, 4B, 5, 6A, 6B, 6C, 7, 8, and 9. For example, UE 902 may receive feedback from the at least one sidelink UE, the feedback corresponding to the timing synchronization procedure, as described in connection with 952 in FIG. 9. Further, 1110 may be performed by determination component 1440 in FIG. 14.

At 1112, the UE may adjust the timing synchronization procedure based on the feedback from the at least one sidelink UE, as described in connection with the examples in FIGS. 4A, 4B, 5, 6A, 6B, 6C, 7, 8, and 9. For example, UE 902 may adjust the timing synchronization procedure based on the feedback from the at least one sidelink UE, as described in connection with 960 in FIG. 9. Further, 1112 may be performed by determination component 1440 in FIG. 14.

Figure 12:
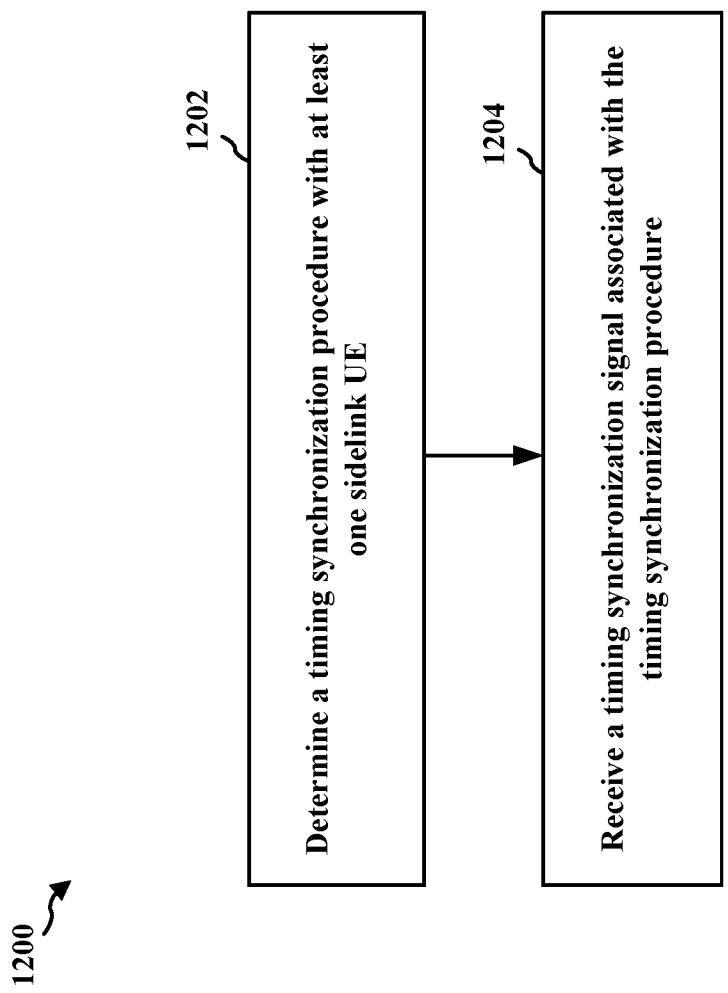
FIG. 12 is a flowchart of a method of wireless communication.

FIG. 12 is a flowchart 1200 of a method of wireless communication. The method may be performed by a UE or a component of a UE (e.g., the UE 104, 350, 904; the apparatus 1502; a processing system, which may include the memory 360 and which may be the entire UE or a component of the UE, such as the TX processor 368, the controller/processor 359, transmitter 354TX, antenna(s) 352, and/or the like). The methods described herein may provide a number of benefits, such as improving communication signaling, resource utilization, and/or power savings.

At 1202, the UE may determine a timing synchronization procedure with at least one sidelink UE, as described in connection with the examples in FIGS. 4A, 4B, 5, 6A, 6B, 6C, 7, 8, and 9. For example, UE 904 may determine a timing synchronization procedure with at least one sidelink UE, as described in connection with 912 in FIG. 9. Further, 1202 may be performed by determination component 1540 in FIG. 15.

At 1204, the UE may receive, from at least one sidelink UE, a timing synchronization signal associated with the timing synchronization procedure, the timing synchronization signal may include at least one of a signal bandwidth or a signal location, as described in connection with the examples in FIGS. 4A, 4B, 5, 6A, 6B, 6C, 7, 8, and 9. For example, UE 904 may receive, from at least one sidelink UE, a timing synchronization signal associated with the timing synchronization procedure, the timing synchronization signal may include at least one of a signal bandwidth or a signal location, as described in connection with 942 in FIG. 9. Further, 1204 may be performed by determination component 1540 in FIG. 15. In some aspects, at least one of the signal bandwidth or the signal location may correspond to one or more resource blocks (RBs), as described in connection with the examples in FIGS. 4A, 4B, 5, 6A, 6B, 6C, 7, 8, and 9.

In some instances, the timing synchronization signal may be associated with at least one synchronization sequence, as described in connection with the examples in FIGS. 4A, 4B, 5, 6A, 6B, 6C, 7, 8, and 9. Also, a UE identifier (ID) may be mapped to the at least one synchronization sequence, as described in connection with the examples in FIGS. 4A, 4B, 5, 6A, 6B, 6C, 7, 8, and 9. The signal location may also be mapped to the at least one synchronization sequence, as described in connection with the examples in FIGS. 4A, 4B, 5, 6A, 6B, 6C, 7, 8, and 9. The signal location may correspond to a resource block (RB) location, as described in connection with the examples in FIGS. 4A, 4B, 5, 6A, 6B, 6C, 7, 8, and 9. Further, the at least one synchronization sequence may be associated with the at least one sidelink UE, as described in connection with the examples in FIGS. 4A, 4B, 5, 6A, 6B, 6C, 7, 8, and 9. The at least one synchronization sequence may be at least one of a maximum length sequence (m-sequence) or a Gold sequence, as described in connection with the examples in FIGS. 4A, 4B, 5, 6A, 6B, 6C, 7, 8, and 9. Moreover, the at least one synchronization sequence may be configured via radio resource control (RRC) signaling, as described in connection with the examples in FIGS. 4A, 4B, 5, 6A, 6B, 6C, 7, 8, and 9. In some aspects, the timing synchronization signal may be received before sidelink control information (SCI) associated with a physical sidelink control channel (PSCCH), as described in connection with the examples in FIGS. 4A, 4B, 5, 6A, 6B, 6C, 7, 8, and 9. Also, the timing synchronization signal may be received after SCI associated with a PSCCH, as described in connection with the examples in FIGS. 4A, 4B, 5, 6A, 6B, 6C, 7, 8, and 9.

Figure 13:
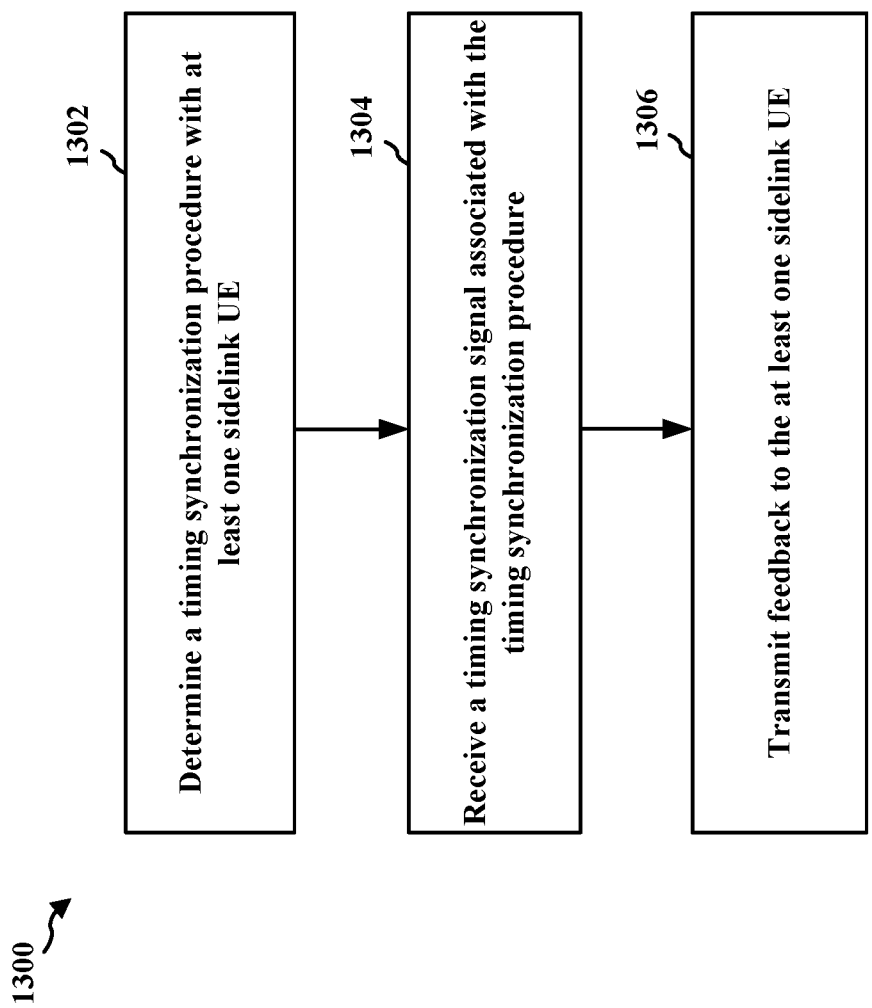
FIG. 13 is a flowchart of a method of wireless communication.

FIG. 13 is a flowchart 1300 of a method of wireless communication. The method may be performed by a UE or a component of a UE (e.g., the UE 104, 350, 904; the apparatus 1502; a processing system, which may include the memory 360 and which may be the entire UE or a component of the UE, such as the TX processor 368, the controller/processor 359, transmitter 354TX, antenna(s) 352, and/or the like). The methods described herein may provide a number of benefits, such as improving communication signaling, resource utilization, and/or power savings.

At 1302, the UE may determine a timing synchronization procedure with at least one sidelink UE, as described in connection with the examples in FIGS. 4A, 4B, 5, 6A, 6B, 6C, 7, 8, and 9. For example, UE 904 may determine a timing synchronization procedure with at least one sidelink UE, as described in connection with 912 in FIG. 9. Further, 1302 may be performed by determination component 1540 in FIG. 15.

At 1304, the UE may receive, from at least one sidelink UE, a timing synchronization signal associated with the timing synchronization procedure, the timing synchronization signal may include at least one of a signal bandwidth or a signal location, as described in connection with the examples in FIGS. 4A, 4B, 5, 6A, 6B, 6C, 7, 8, and 9. For example, UE 904 may receive, from at least one sidelink UE, a timing synchronization signal associated with the timing synchronization procedure, the timing synchronization signal may include at least one of a signal bandwidth or a signal location, as described in connection with 942 in FIG. 9. Further, 1304 may be performed by determination component 1540 in FIG. 15. In some aspects, at least one of the signal bandwidth or the signal location may correspond to one or more resource blocks (RBs), as described in connection with the examples in FIGS. 4A, 4B, 5, 6A, 6B, 6C, 7, 8, and 9.

In some instances, the timing synchronization signal may be associated with at least one synchronization sequence, as described in connection with the examples in FIGS. 4A, 4B, 5, 6A, 6B, 6C, 7, 8, and 9. Also, a UE identifier (ID) may be mapped to the at least one synchronization sequence, as described in connection with the examples in FIGS. 4A, 4B, 5, 6A, 6B, 6C, 7, 8, and 9. The signal location may also be mapped to the at least one synchronization sequence, as described in connection with the examples in FIGS. 4A, 4B, 5, 6A, 6B, 6C, 7, 8, and 9. The signal location may correspond to a resource block (RB) location, as described in connection with the examples in FIGS. 4A, 4B, 5, 6A, 6B, 6C, 7, 8, and 9. Further, the at least one synchronization sequence may be associated with the at least one sidelink UE, as described in connection with the examples in FIGS. 4A, 4B, 5, 6A, 6B, 6C, 7, 8, and 9. The at least one synchronization sequence may be at least one of a maximum length sequence (m-sequence) or a Gold sequence, as described in connection with the examples in FIGS. 4A, 4B, 5, 6A, 6B, 6C, 7, 8, and 9. Moreover, the at least one synchronization sequence may be configured via radio resource control (RRC) signaling, as described in connection with the examples in FIGS. 4A, 4B, 5, 6A, 6B, 6C, 7, 8, and 9. In some aspects, the timing synchronization signal may be received before sidelink control information (SCI) associated with a physical sidelink control channel (PSCCH), as described in connection with the examples in FIGS. 4A, 4B, 5, 6A, 6B, 6C, 7, 8, and 9. Also, the timing synchronization signal may be received after SCI associated with a PSCCH, as described in connection with the examples in FIGS. 4A, 4B, 5, 6A, 6B, 6C, 7, 8, and 9.

At 1306, the UE may transmit feedback to the at least one sidelink UE, the feedback corresponding to the timing synchronization procedure, as described in connection with the examples in FIGS. 4A, 4B, 5, 6A, 6B, 6C, 7, 8, and 9. For example, UE 904 may transmit feedback to the at least one sidelink UE, the feedback corresponding to the timing synchronization procedure, as described in connection with 950 in FIG. 9. Further, 1306 may be performed by determination component 1540 in FIG. 15. Moreover, the timing synchronization procedure may be adjusted based on the transmitted feedback, as described in connection with the examples in FIGS. 4A, 4B, 5, 6A, 6B, 6C, 7, 8, and 9.

Figure 14:
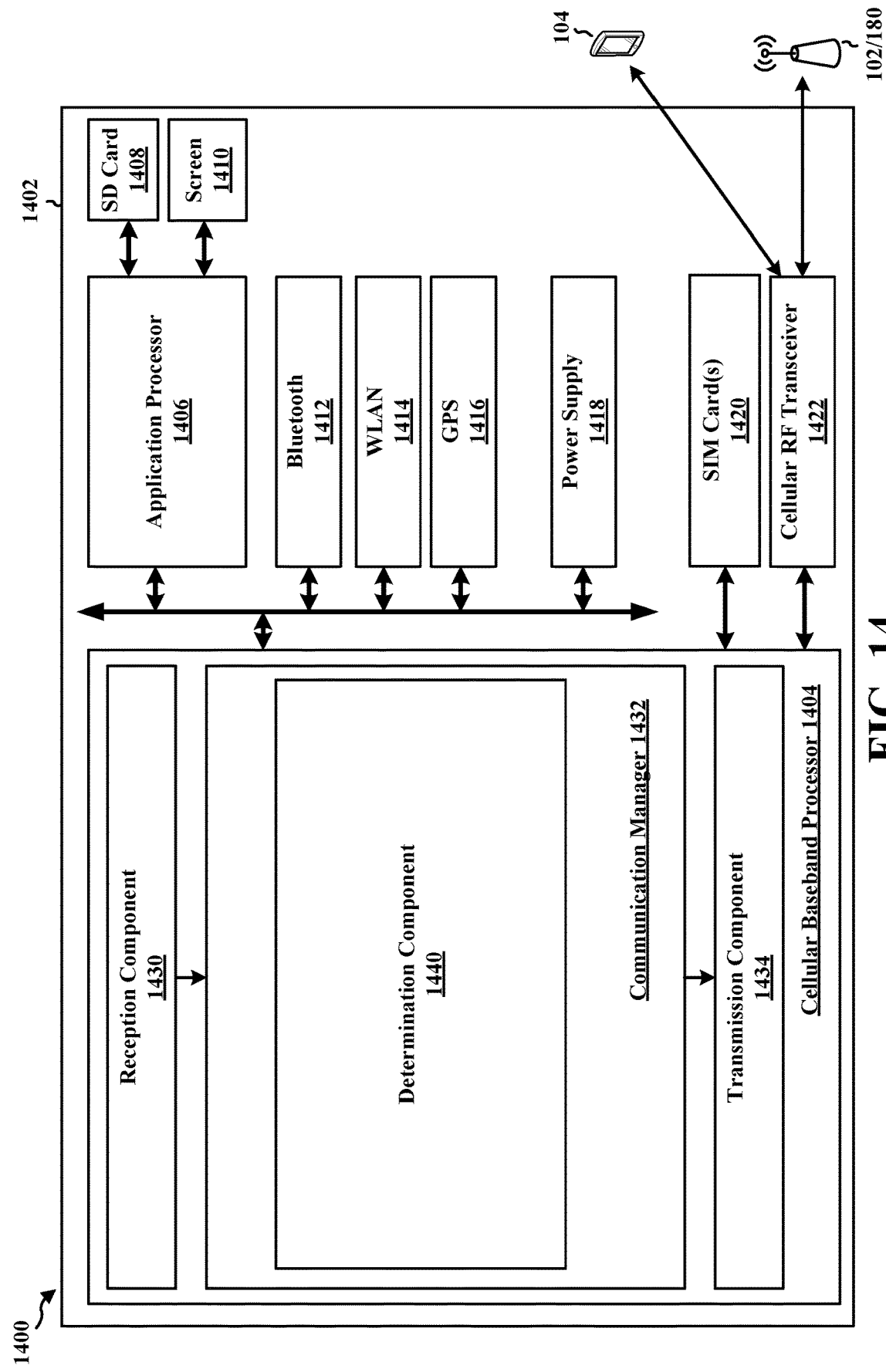
FIG. 14 is a diagram illustrating an example of a hardware implementation for an example apparatus.

FIG. 14 is a diagram 1400 illustrating an example of a hardware implementation for an apparatus 1402. The apparatus 1402 is a UE and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the aforediscussed additional modules of the apparatus 1402.

The communication manager 1432 includes a determination component 1440 that is configured to determine a timing synchronization procedure with at least one sidelink UE, e.g., as described in connection with step 1102 above. Determination component 1440 may also be configured to determine at least one of a signal bandwidth or a signal location of a timing synchronization signal, e.g., as described in connection with step 1104 above. Determination component 1440 may also be configured to configure a timing synchronization signal associated with the timing synchronization procedure, the timing synchronization signal including at least one of a signal bandwidth or a signal location, e.g., as described in connection with step 1106 above. Determination component 1440 may also be configured to transmit, to the at least one sidelink UE, the timing synchronization signal associated with the timing synchronization procedure, e.g., as described in connection with step 1108 above. Determination component 1440 may also be configured to receive feedback from the at least one sidelink UE, the feedback corresponding to the timing synchronization procedure, e.g., as described in connection with step 1110 above. Determination component 1440 may also be configured to adjust the timing synchronization procedure based on the feedback from the at least one sidelink UE, e.g., as described in connection with step 1112 above.

The apparatus may include additional components that perform each of the blocks of the algorithm in the aforementioned flowcharts of FIGS. 9-11. As such, each block in the aforementioned flowcharts of FIGS. 9-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes means for determining a timing synchronization procedure with at least one sidelink UE. The apparatus 1402 may also include means for configuring a timing synchronization signal associated with the timing synchronization procedure, the timing synchronization signal including at least one of a signal bandwidth or a signal location. The apparatus 1402 may also include means for transmitting, to the at least one sidelink UE, the timing synchronization signal associated with the timing synchronization procedure. The apparatus 1402 may also include means for determining at least one of a signal bandwidth or a signal location of a timing synchronization signal. The apparatus 1402 may also include means for receiving feedback from the at least one sidelink UE, the feedback corresponding to the timing synchronization procedure. The apparatus 1402 may also include means for adjusting the timing synchronization procedure based on the feedback from the at least one sidelink UE. The aforementioned means may be one or more of the aforementioned components of the apparatus 1402 configured to perform the functions recited by the aforementioned means. As described supra, the apparatus 1402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
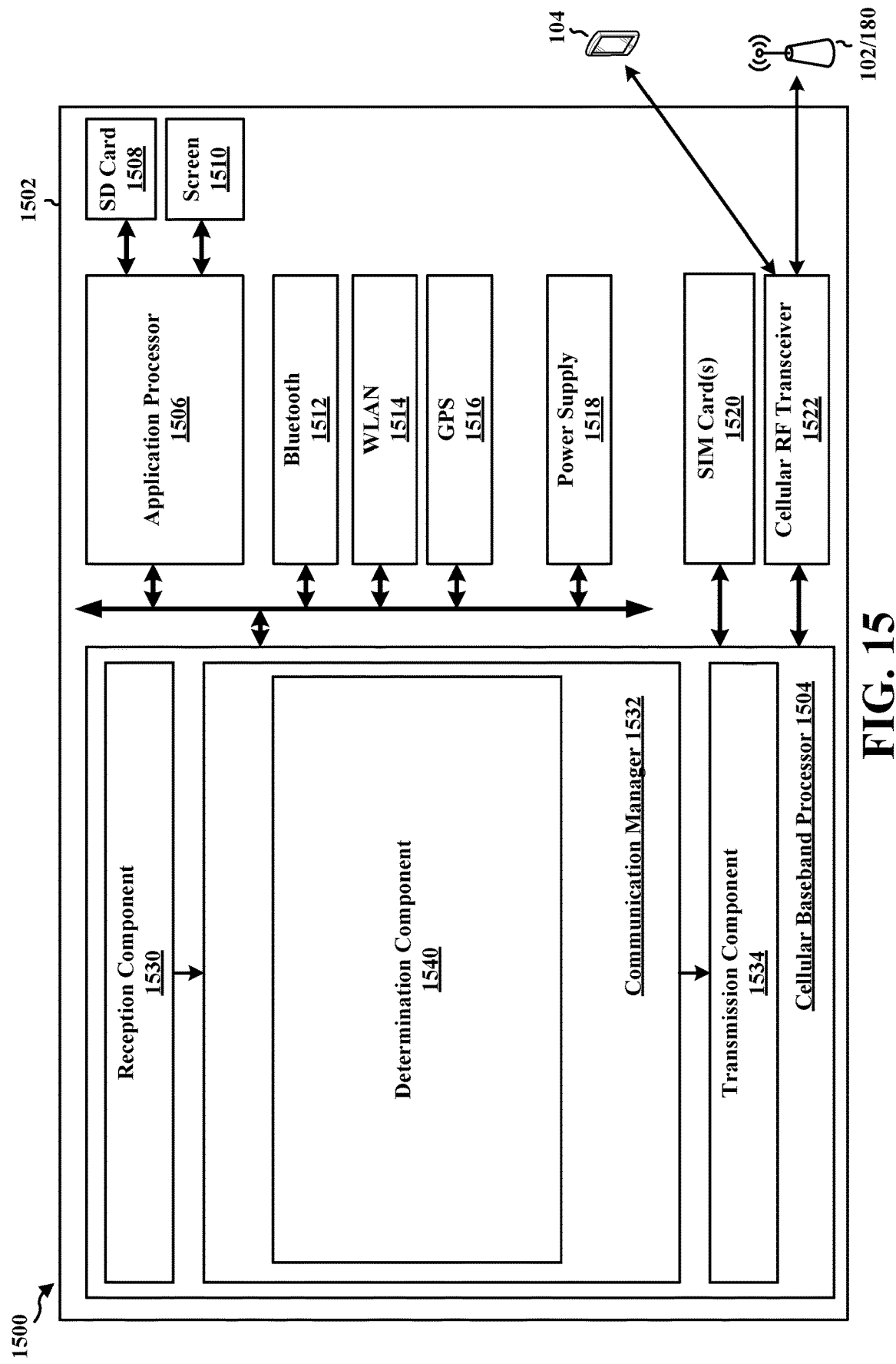
FIG. 15 is a diagram illustrating an example of a hardware implementation for an example apparatus.

FIG. 15 is a diagram 1500 illustrating an example of a hardware implementation for an apparatus 1502. The apparatus 1502 is a UE and includes a cellular baseband processor 1504 (also referred to as a modem) coupled to a cellular RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the aforediscussed additional modules of the apparatus 1502.

The communication manager 1532 includes a determination component 1540 that is configured to determine a timing synchronization procedure with at least one sidelink UE, e.g., as described in connection with step 1302 above. Determination component 1540 may also be configured to receive, from the at least one sidelink UE, a timing synchronization signal associated with the timing synchronization procedure, the timing synchronization signal including at least one of a signal bandwidth or a signal location, e.g., as described in connection with step 1304 above. Determination component 1540 may also be configured to transmit feedback to the at least one sidelink UE, the feedback corresponding to the timing synchronization procedure, e.g., as described in connection with step 1306 above.

The apparatus may include additional components that perform each of the blocks of the algorithm in the aforementioned flowcharts of FIGS. 9, 12, and 13. As such, each block in the aforementioned flowcharts of FIGS. 9, 12, and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the cellular baseband processor 1504, includes means for determining a timing synchronization procedure with at least one sidelink UE. The apparatus 1502 may also include means for receiving, from the at least one sidelink UE, a timing synchronization signal associated with the timing synchronization procedure, the timing synchronization signal including at least one of a signal bandwidth or a signal location. The apparatus 1502 may also include means for transmitting feedback to the at least one sidelink UE, the feedback corresponding to the timing synchronization procedure. The aforementioned means may be one or more of the aforementioned components of the apparatus 1502 configured to perform the functions recited by the aforementioned means. As described supra, the apparatus 1502 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to: determine a timing synchronization procedure with at least one sidelink UE; configure a timing synchronization signal associated with the timing synchronization procedure, the timing synchronization signal including at least one of a signal bandwidth or a signal location; and transmit, to the at least one sidelink UE, the timing synchronization signal associated with the timing synchronization procedure.

Aspect 2 is the apparatus of aspect 1, where the timing synchronization signal is transmitted before sidelink control information (SCI) associated with a physical sidelink control channel (PSCCH).

Aspect 3 is the apparatus of any of aspects 1 and 2, where the timing synchronization signal is transmitted after sidelink control information (SCI) associated with a physical sidelink control channel (PSCCH).

Aspect 4 is the apparatus of any of aspects 1 to 3, where the timing synchronization signal is associated with at least one synchronization sequence.

Aspect 5 is the apparatus of any of aspects 1 to 4, where a UE identifier (ID) is mapped to the at least one synchronization sequence.

Aspect 6 is the apparatus of any of aspects 1 to 5, where the signal location is mapped to the at least one synchronization sequence.

Aspect 7 is the apparatus of any of aspects 1 to 6, where the signal location corresponds to a resource block (RB) location.

Aspect 8 is the apparatus of any of aspects 1 to 7, where the at least one synchronization sequence is associated with the at least one sidelink UE.

Aspect 9 is the apparatus of any of aspects 1 to 8, where the at least one synchronization sequence is at least one of a maximum length sequence (m-sequence) or a Gold sequence.

Aspect 10 is the apparatus of any of aspects 1 to 9, where the at least one synchronization sequence is configured via radio resource control (RRC) signaling.

Aspect 11 is the apparatus of any of aspects 1 to 10, where the at least one processor is further configured to: determine at least one of the signal bandwidth or the signal location of the timing synchronization signal.

Aspect 12 is the apparatus of any of aspects 1 to 11, where at least one of the signal bandwidth or the signal location corresponds to one or more resource blocks (RBs).

Aspect 13 is the apparatus of any of aspects 1 to 12, further including a transceiver coupled to the at least one processor, where the at least one processor is further configured to: receive feedback from the at least one sidelink UE, the feedback corresponding to the timing synchronization procedure.

Aspect 14 is the apparatus of any of aspects 1 to 13, where the at least one processor is further configured to: adjust the timing synchronization procedure based on the feedback from the at least one sidelink UE.

Aspect 15 is a method of wireless communication for implementing any of aspects 1 to 14.

Aspect 16 is an apparatus for wireless communication including means for implementing any of aspects 1 to 14.

Aspect 17 is a computer-readable medium storing computer executable code, where the code when executed by a processor causes the processor to implement any of aspects 1 to 14.

Aspect 18 is an apparatus for wireless communication at a UE including at least one processor coupled to a memory and configured to: determine a timing synchronization procedure with at least one sidelink UE; and receive, from the at least one sidelink UE, a timing synchronization signal associated with the timing synchronization procedure, the timing synchronization signal including at least one of a signal bandwidth or a signal location.

Aspect 19 is the apparatus of aspect 18, where the timing synchronization signal is received before sidelink control information (SCI) associated with a physical sidelink control channel (PSCCH).

Aspect 20 is the apparatus of any of aspects 18 and 19, where the timing synchronization signal is received after sidelink control information (SCI) associated with a physical sidelink control channel (PSCCH).

Aspect 21 is the apparatus of any of aspects 18 to 20, where the timing synchronization signal is associated with at least one synchronization sequence.

Aspect 22 is the apparatus of any of aspects 18 to 21, where a UE identifier (ID) is mapped to the at least one synchronization sequence.

Aspect 23 is the apparatus of any of aspects 18 to 22, where the signal location is mapped to the at least one synchronization sequence.

Aspect 24 is the apparatus of any of aspects 18 to 23, where the signal location corresponds to a resource block (RB) location.

Aspect 25 is the apparatus of any of aspects 18 to 24, where the at least one synchronization sequence is associated with the at least one sidelink UE.

Aspect 26 is the apparatus of any of aspects 18 to 25, where the at least one synchronization sequence is at least one of a maximum length sequence (m-sequence) or a Gold sequence.

Aspect 27 is the apparatus of any of aspects 18 to 26, where the at least one synchronization sequence is configured via radio resource control (RRC) signaling.

Aspect 28 is the apparatus of any of aspects 18 to 27, where at least one of the signal bandwidth or the signal location corresponds to one or more resource blocks (RBs).

Aspect 29 is the apparatus of any of aspects 18 to 28, where the at least one processor is further configured to: transmit feedback to the at least one sidelink UE, the feedback corresponding to the timing synchronization procedure.

Aspect 30 is the apparatus of any of aspects 18 to 29, where the timing synchronization procedure is adjusted based on the transmitted feedback.

Aspect 31 is the apparatus of any of aspects 18 to 30, further including a transceiver coupled to the at least one processor.

Aspect 32 is a method of wireless communication for implementing any of aspects 18 to 31.

Aspect 33 is an apparatus for wireless communication including means for implementing any of aspects 18 to 31.

Aspect 34 is a computer-readable medium storing computer executable code, where the code when executed by a processor causes the processor to implement any of aspects 18 to 31.

What is claimed is:

1. An apparatus for wireless communication at a user equipment (UE), comprising:
   memory; and
   one or more processors coupled to the memory, wherein the one or more processors are configured to:
   determine a timing synchronization procedure with at least one sidelink UE;
   configure a timing synchronization signal associated with the timing synchronization procedure, the timing synchronization signal including at least one of a signal bandwidth or a signal location,
   wherein the timing synchronization signal corresponds to sidelink control information (SCI) associated with a physical sidelink control channel (PSCCH) that schedules a physical sidelink shared channel (PSSCH); and
   transmit, to the at least one sidelink UE, before or after the SCI, and partially overlapping with the PSSCH, the timing synchronization signal associated with the timing synchronization procedure.

2. The apparatus of claim 1, wherein to transmit the timing synchronization signal, the one or more processors are configured to transmit the timing synchronization signal before the SCI associated with the PSCCH.

3. The apparatus of claim 1, wherein to transmit the timing synchronization signal, the one or more processors are configured to transmit the timing synchronization signal after the SCI.

4. The apparatus of claim 1, wherein the timing synchronization signal is associated with at least one synchronization sequence.

5. The apparatus of claim 4, wherein a UE identifier (ID) is mapped to the at least one synchronization sequence.

6. The apparatus of claim 4, wherein the signal location is mapped to the at least one synchronization sequence.

7. The apparatus of claim 6, wherein the signal location corresponds to a resource block (RB) location.

8. The apparatus of claim 4, wherein the at least one synchronization sequence is associated with the at least one sidelink UE.

9. The apparatus of claim 4, wherein the at least one synchronization sequence is at least one of a maximum length sequence (m-sequence) or a Gold sequence.

10. The apparatus of claim 4, wherein the one or more processors are further configured to:
receive a configuration that indicates the at least one synchronization sequence via radio resource control (RRC) signaling.

11. The apparatus of claim 1, wherein the one or more processors are further configured to:
determine at least one of the signal bandwidth or the signal location of the timing synchronization signal.

12. The apparatus of claim 11, wherein at least one of the signal bandwidth or the signal location corresponds to one or more resource blocks (RBs).

13. The apparatus of claim 1, further comprising a transceiver coupled to the one or more processors, wherein the one or more processors are further configured to:
receive feedback from the at least one sidelink UE, the feedback corresponding to the timing synchronization procedure.

14. The apparatus of claim 13, wherein the one or more processors are further configured to:
adjust the timing synchronization procedure based on the feedback from the at least one sidelink UE.

15. A method of wireless communication at a user equipment (UE), comprising:
determining a timing synchronization procedure with at least one sidelink UE;
configuring a timing synchronization signal associated with the timing synchronization procedure, the timing synchronization signal including at least one of a signal bandwidth or a signal location, wherein the timing synchronization signal corresponds to sidelink control information (SCI) associated with a physical sidelink control channel (PSCCH) that schedules a physical sidelink shared channel (PSSCH); and
transmitting, to the at least one sidelink UE, before or after the SCI, and partially overlapping with the PSSCH, the timing synchronization signal associated with the timing synchronization procedure.

16. An apparatus for wireless communication at a user equipment (UE), comprising:
memory; and
one or more processors coupled to the memory, wherein the one or more processors are configured to:
determine a timing synchronization procedure with at least one sidelink UE; and
receive, from the at least one sidelink UE, before or after sidelink control information (SCI) and partially overlapping with a physical sidelink shared channel (PSSCH), a timing synchronization signal associated with the timing synchronization procedure, the timing synchronization signal including at least one of a signal bandwidth or a signal location, wherein the timing synchronization signal corresponds to the SCI that is associated with a physical sidelink control channel (PSCCH) that schedules the PSSCH.

17. The apparatus of claim 16, wherein to receive the timing synchronization signal, the one or more processors are configured to receive the timing synchronization signal before the SCI the PSCCH.

18. The apparatus of claim 16, wherein to receive the timing synchronization signal, the one or more processors are configured to receive the timing synchronization signal after the SCI associated with the PSCCH.

19. The apparatus of claim 16, wherein the timing synchronization signal is associated with at least one synchronization sequence.

20. The apparatus of claim 19, wherein a UE identifier (ID) is mapped to the at least one synchronization sequence.

21. The apparatus of claim 19, wherein the signal location is mapped to the at least one synchronization sequence.

22. The apparatus of claim 21, wherein the signal location corresponds to a resource block (RB) location.

23. The apparatus of claim 19, wherein the at least one synchronization sequence is associated with the at least one sidelink UE.

24. The apparatus of claim 19, wherein the at least one synchronization sequence is at least one of a maximum length sequence (m-sequence) or a Gold sequence.

25. The apparatus of claim 19, wherein the one or more processors are further configured to:
receive a configuration that indicates the at least one synchronization sequence via radio resource control (RRC) signaling.

26. The apparatus of claim 16, wherein at least one of the signal bandwidth or the signal location corresponds to one or more resource blocks (RBs).

27. The apparatus of claim 16, wherein the one or more processors are further configured to:
transmit feedback to the at least one sidelink UE, the feedback corresponding to the timing synchronization procedure.

28. The apparatus of claim 27, wherein the timing synchronization procedure is adjusted based on the transmitted feedback.

29. The apparatus of claim 16, further comprising a transceiver coupled to the one or more processors.

30. A method of wireless communication at a user equipment (UE), comprising:
determining a timing synchronization procedure with at least one sidelink UE; and
receiving, from the at least one sidelink UE, before or after sidelink control information (SCI) and partially overlapping with a physical sidelink shared channel (PSSCH), a timing synchronization signal associated with the timing synchronization procedure, the timing synchronization signal including at least one of a signal bandwidth or a signal location, wherein the SCI corresponds to a physical sidelink control channel (PSCCH) that schedules the PSSCH.

* * * * *